United States Patent [19]
Matsubara

[11] 4,057,328
[45] Nov. 8, 1977

[54] ENLARGING LENS SYSTEM

[75] Inventor: Masaki Matsubara, Hachiouji, Japan

[73] Assignee: Olympus Optical Co., Ltd., Japan

[21] Appl. No.: 645,210

[22] Filed: Dec. 29, 1975

[30] Foreign Application Priority Data
Dec. 30, 1974   Japan .................................. 50-2223

[51] Int. Cl.² ............................ G02B 9/64; G02B 9/62
[52] U.S. Cl. ...................................... 350/214; 350/215
[58] Field of Search ................................ 350/215, 214

[56] References Cited
U.S. PATENT DOCUMENTS

| | | | |
|---|---|---|---|
| 3,006,249 | 10/1961 | Mandler | 350/215 X |
| 3,370,905 | 2/1968 | Hudson | 350/215 X |

FOREIGN PATENT DOCUMENTS 1,030,163   3/1953   France .................. 350/215

*Primary Examiner*—Paul A. Sacher
*Attorney, Agent, or Firm*—Cushman, Darby & Cushman

[57] ABSTRACT

An enlarging lens system comprising a first lens component which is a positive meniscus lens, a second lens component which comprises a positive meniscus lens and negative meniscus lens, a third and fourth lens components which are respectively positive meniscus lenses, a fifth lens component which comprises a negative meniscus lens and positive meniscus lens, and a sixth lens component which is a positive meniscus lens. Said enlarging lens system is characterized in that thin lenses having weak refractive powers are used as the third and fourth lens components, the aperture ratio is large and aberrations are favorably corrected.

4 Claims, 22 Drawing Figures

ENLARGING LENS SYSTEM

BACKGROUND OF THE INVENTION a. Field of the Invention

The present invention relates to an enlarging lens system for photomechanical process.

b. Description of the Prior Art

Unlike general photographic lenses, lens systems for photomechanical process must be so designed as to uniformly corrected various aberrations when objects at short distance are photographed since such lens systems are used for copying plane objects at short distance with high fidelity. Lens systems for photomechanical process must assure high image flatness and little distortion especially on large image planes. For satisfying these requirements, lens systems for photomechanical process must have long focal length and, therefore, it becomes rather difficult to design lens systems having large aperture ratios. Especially in case of enlarging lens systems, however, they should preferably have aperture ratios as large as possible since light intensity is attenuated so much during half-tone separation, masking, etc. in the photographing process that a long exposure time is required. Especially on a large image plane, image flatness is degraded and satisfactory images may not be obtained in circumferential areas.

SUMMARY OF THE INVENTION

It is, therefore, a primary object of the present invention to provide an enlarging lens system for photomechanical process which has magnification of X2 to X8, aperture ratio of F/3.5, field angle of 50° and wherein aberrations for objects at short distances are favourably corrected.

The enlarging lens system according to the present invention comprises a front lens group arranged on the object side of the stop and a rear lens group arranged on the image side of the stop, said front lens group comprising a first, second and third lens components, said rear lens group comprising a fourth, fifth and sixth lens components. In said front lens group, the first lens component is a positive meniscus lens, the second lens component comprises a positive meniscus lens and negative meniscus lens which are cemented together or arranged with a narrow airspace therebetween, and a third lens component is a thin positive meniscus lens having weak refractive power. In said rear lens group, the fourth lens component is a thin positive meniscus lens having weak refractive power, the fifth lens component comprises a negative meniscus lens and positive meniscus lens which are cemented together or arranged with a narrow airspace therebetween, and the sixth lens component is a positive meniscus lens. By arranging thin positive meniscus lens having weak refractive powers on both sides of the stop as described in the above, the enlarging lens system according to the present invention is arranged to favourably correct astigmatism and, moreover, to attain favourably correction of curvature of field which is especially important for enlarging lens systems. Thus, it is so arranged that satisfactory image flatness is obtained even in circumferential areas.

Moreover, for negative meniscus lenses constituting the second and fifth lens components, materials having large refractive indices are used and radii of curvature of their concave surfaces on the stop side are made as large as possible. Thus, it is so arranged to prevent coma, to be caused by offaxial aberrations, and astigmatism, both of which may otherwise be caused by said concave surfaces of said negative meniscus lenses, so that the quality of image in circumferential areas is further improved and that zonal spherical aberration to be caused by said concave surfaces is also corrected favourably.

Moreover, the enlarging lens system according to the present invention is arranged to satisfy the following conditions when reference symbols $f_3$ and $f_4$ respectively represent focal lengths of the third and fourth lens components positioned on both sides of the stop, reference symbols $n_2$, $n_3$, $n_6$ and $n_7$ respectively represent refractive indices of front and rear lenses constituting the second and fifth lens components, and reference symbols $r_4$ and $r_{11}$ respectively represent radii of curvature of cemented surfaces of the second and fifth lens components (when said second and fifth lens components do not comprise cemented doublet lenses but comprise separate lenses, reference symbols $r_4$, $r_4'$, $r_{11}$ and $r_{11}'$ respectively represent radii of curvature of separated surfaces).

$$2f < f_3 < 5f \quad (1)$$

$$4f < f_4 < 15f \quad (2)$$

$$0.06 < n_3 - n_2 < 0.18 \quad (3)$$

$$0.06 < n_6 - n_7 < 0.18 \quad (4)$$

$$r_4 > 0, r_4' > 0 \quad (5)$$

$$r_{11} < 0, r_{11}' > 0 \quad (6)$$

Meaning of the above-mentioned respective conditions for the present invention is described below. Out of the above, conditions (1) and (2) relate to the third and fourth lens components positioned on both sides of the stop. Purpose of these conditions is to arrange the third and fourth lens components as thin lenses having weak refractive powers as described before so that those lenses will refract only the oblique rays in circumferential areas which enter these lenses at large angles. Thus, astigmatism of said rays entering at large angles will be corrected favourably and, consequently, image flatness even for circumferential areas of the field will be made favourable. If $f_3$ and/or $f_4$ exceed their upper limits, refractive powers of these lenses become too weak and it becomes impossible to favourably correct astigmatism. If $f_3$ and/or $f_4$ become smaller than their lower limits, refractive powers become too strong and these lenses will refract also those rays which enter them at comparatively small angles. As a result, spherical aberration and other aberrrations will be caused so that they cannot be corrected by the other lenses and, consequently, various aberrations of the lens system as a whole cannot be well balanced.

Now, conditions (3) and (4) relate to the second and fifth lens components and object of these conditions are as follows. That is, for negative meniscus lenses respectively arranged on the stop side in the second and fifth lens components, materials having refractive indices as high as possible are used as defined by these conditions so that radii of curvature of concave surfaces on the stop side of these negative meniscus lenses can be made as large as possible. By the above, it is possible to minimize spherical aberration, coma to be caused by offaxial aberrations, astigmatism and distortion which may respectively caused by lens surfaces having small radii of curvatures. If $n_3 - n_2$ and/or $n_6 - n_7$ of conditions (3) and (4) exceed their upper limits, radii of curvature of the above-mentioned concave surfaces of these negative meniscus lenses will become large and, therefore, it is possible to prevent the above-mentioned aberrations. As, however, refractive indices of said negative meniscus lenses become too large and results in reverse effect for correction of Petzval's sum which is not desirable. Moreover, refractive indices of positive meniscus lenses constituting the second and fifth lens components will become small and it becomes unavoidable for making radii of curvatures of convex surfaces $r_3$ and $r_{12}$ on outer side of said positive meniscus lenses small. As a result, considerable spherical aberration will be caused and it becomes impossible to correct it by the other lenses. If $n_3 - n_2$ and/or $n_6 - n_7$ become smaller than their lower limits, radii of curvature of concave surfaces on the stop side of negative meniscus lenses, which are respectively arranged on the stop side in said second and fifth lens components, become small. As a result, the above-mentioned aberrations will be caused considerably and it becomes impossible to correct them by the other lenses.

Conditions (5) and (6) relate to cemented surfaces of the second and fifth lens components (when said second and fifth lens components do not comprise cemented doublet lenses but comprise two separate lenses arranged with narrow airspaces therebetween, these conditions relate to respective lens surfaces facing to said airspaces). For correction of aberrations, it is generally desirable to arrange lenses so that their curved surfaces become concave toward the stop, except for the cases of special lenses. Besides, when lenses are arranged so that their curved surfaces become concave toward the stop, it is possible to make lens thicknesses small. When the aperture ratio and field angle are large as in the case of the lens system according to the present invention, the lens system as a whole tends to become large and, therefore, the fact that lens thicknesses can be made small as above is preferable because the lens system as a whole can be then made compact. If, in conditions (5) and (6), said cemented surfaces become convex toward the stop, i.e., if it becomes $r_4 < 0$, $r_4' < 0$ and $r_{11} > 0$, $r_{11}' > 0$, these curved surfaces will have negative power (when the second and fifth lens components are not cemented doublet lenses, some of surfaces, for example, $r_4$ may have positive power). Though this is preferable for correction of spherical aberration, it becomes necessary to make large the difference between refractive indices of respective lenses, constituting each of said cemented doublet lenses in order to make said negative power stronger. In that case, radii of curvature of outer surfaces $r_3$ and $r_{12}$ of positive meniscus lenses constituting said cemented doublet lenses will become small as already explained in relation to conditions (3) and (4). As a result, considerable spherical aberration will be caused by these surfaces and, therefore, it becomes impossible to balance aberrations favourably. Furthermore, considerable astigmatism will be caused as described already and, moreover, it will become impossible to make the lens system compact.

Besides, an enlarging system is generally used by various magnifications within a certain range of magnifications. Therefore, aberrations will be aggravated considerably when the lens system is used by a magnification other than the design value, especially by a magnification largely different from the design value. The lens system according to the present invention is also characterized in that some of lenses are arranged to be floated in order to prevent such aggravation of aberrations.

DETAILED DESCRIPTION OF THE PREFERRED EMBODIMENTS

Preferred embodiments of the enlarging lens system according to the present invention explained in the above are as shown below.

Embodiment 1
F/3.5, $2\omega = 51°$, f = 100

| | | | |
|---|---|---|---|
| $r_1 =$ | 43.002 | | |
| | $d_1 = 9.7$ | $n_1 = 1.658$ | $\nu_1 = 57.3$ |
| $r_2 =$ | 82.828 | | |
| | $d_2 = 0.94$ | | |
| $r_3 =$ | 29.853 | | |
| | $d_3 = 7.89$ | $n_2 = 1.651$ | $\nu_2 = 56.2$ |
| $r_4 =$ | 45.678 | | |
| | $d_4' = 0.33$ | | |
| $r_4' =$ | 31.564 | | |
| | $d_4 = 2.67$ | $n_3 = 1.74$ | $\nu_3 = 31.7$ |
| $r_5 =$ | 17.391 | | |
| | $d_5 = 7.36$ | | |
| $r_6 =$ | 65.049 | | |
| | $d_6 = 3.21$ | $n_4 = 1.511$ | $\nu_4 = 60.5$ |
| $r_7 =$ | 89.759 | | |
| | $d_7 = 8.83$ | | |
| $r_8 =$ | −80.717 | | |
| | $d_8 = 3.21$ | $n_5 = 1.511$ | $\nu_5 = 60.5$ |
| $r_9 =$ | −65.111 | | |
| | $d_9 = 5.82$ | | |
| $r_{10} =$ | −19.141 | | |
| | $d_{10} = 2.67$ | $n_6 = 1.755$ | $\nu_6 = 27.5$ |
| $r_{11} =$ | −34.134 | | |
| | $d_{11} = 7.09$ | $n_7 = 1.678$ | $\nu_7 = 55.3$ |
| $r_{12} =$ | −22.956 | | |
| | $d_{12} = 0.28$ | | |
| $r_{13} =$ | −109.774 | | |
| | $d_{13} = 5.35$ | $n_8 = 1.678$ | $\nu_8 = 55.3$ |
| $r_{14} =$ | −50.866 | | |
| | $f_3 = 442.5, f_4 = 515$ | | |

Embodiment 2
F/3.5, $2\omega = 51°$, f = 100

| | | | |
|---|---|---|---|
| $r_1 =$ | 42.293 | | |
| | $d_1 = 9.072$ | $n_1 = 1.658$ | $\nu_1 = 57.3$ |
| $r_2 =$ | 114.327 | | |
| | $d_2 = 0.941$ | | |
| $r_3 =$ | 29.087 | | |
| | $d_3 = 8.333$ | $n_2 = 1.678$ | $\nu_2 = 53.4$ |
| $r_4 =$ | 54.360 | | |
| | $d_4 = 2.554$ | $n_3 = 1.75$ | $\nu_3 = 35.2$ |
| $r_5 =$ | 18.767 | | |
| | $d_5 = 6.384$ | | |
| $r_6 =$ | 47.849 | | |
| | $d_6 = 3.226$ | $n_4 = 1.511$ | $\nu_4 = 60.5$ |
| $r_7 =$ | 75.093 | | |
| | $d_7 = 8.534$ | | |
| $r_8 =$ | −69.216 | | |

-continued

Embodiment 2

| | | | |
|---|---|---|---|
| | $d_8 = 3.226$ | $n_5 = 1.511$ | $v_5 = 60.5$ |
| $r_9 =$ | $-54.054$ | | |
| | $d_9 = 5.779$ | | |
| $r_{10} =$ | $-19.838$ | | |
| | $d_{10} = 2.554$ | $n_6 = 1.74$ | $v_5 = 31.7$ |
| $r_{11} =$ | $-41.143$ | | |
| | $d_{11} = 7.728$ | $n_7 = 1.623$ | $v_7 = 57.1$ |
| $r_{12} =$ | $-23.143$ | | |
| | $d_{12} = 0.269$ | | |
| $r_{13} =$ | $-139.129$ | | |
| | $d_{13} = 5.107$ | $n_8 = 1.694$ | $v_8 = 53.3$ |
| $r_{14} =$ | $-59.049$ | | |
| | $f_3 = 248.1$, $f_4 = 450.3$ | | |

Embodiment 3

$F/2$, $2\omega = 51°$, $f = 100$

| | | | |
|---|---|---|---|
| $r_1 =$ | 42.24 | | |
| | $d_1 = 9.628$ | $n_1 = 1.658$ | $v_1 = 57.3$ |
| $r_2 =$ | 86.542 | | |
| | $d_2 = 1.328$ | | |
| $r_3 =$ | 29.19 | | |
| | $d_3 = 7.835$ | $n_2 = 1.651$ | $v_2 = 56.2$ |
| $r_4 =$ | 45.43 | | |
| | $d_4' = 0.332$ | | |
| $r_4' =$ | 30.932 | | |
| | $d_4 = 2.656$ | $n_3 = 1.807$ | $v_3 = 35.4$ |
| $r_5 =$ | 17.784 | | |
| | $d_5 = 7.304$ | | |
| $r_6 =$ | 63.751 | | |
| | $d_6 = 3.187$ | $n_4 = 1.498$ | $v_4 = 66.8$ |
| $r_7 =$ | 87.125 | | |
| | $d_7 = 8.765$ | | |
| $r_8 =$ | $-75.216$ | | |
| | $d_8 = 3.187$ | $n_5 = 1.498$ | $v_5 = 66.8$ |
| $r_9 =$ | $-68.547$ | | |
| | $d_9 = 6.64$ | | |
| $r_{10} =$ | $-18.527$ | | |
| | $d_{10} = 2.656$ | $n_6 = 1.755$ | $v_6 = 27.5$ |
| $r_{11} =$ | $-33.967$ | | |
| | $d_{11} = 7.038$ | $n_7 = 1.67$ | $v_7 = 57.3$ |
| $r_{12} =$ | $-23.101$ | | |
| | $d_{12} = 1.328$ | | |
| $r_{13} =$ | $-103.892$ | | |
| | $d_{13} = 5.312$ | $n_8 = 1.678$ | $v_8 = 55.3$ |
| $r_{14} =$ | $-43.949$ | | |
| | $f_3 = 456.5$, $f_4 = 1339.6$ | | |

Embodiment 4

$F/2$, $2\omega = 51°$, $f = 100$

| | | | |
|---|---|---|---|
| $r_1 =$ | 43.292 | | |
| | $d_1 = 9.005$ | $n_1 = 1.658$ | $v_1 = 57.3$ |
| $r_2 =$ | 133.279 | | |
| | $d_2 = 1.334$ | | |
| $r_3 =$ | 28.255 | | |
| | $d_3 = 8.271$ | $n_2 = 1.678$ | $v_2 = 53.4$ |
| $r_4 =$ | 52.603 | | |
| | $d_4 = 2.535$ | $n_3 = 1.783$ | $v_3 = 36.2$ |
| $r_5 =$ | 18.831 | | |
| | $d_5 = 6.337$ | | |
| $r_6 =$ | 46.768 | | |
| | $d_6 = 3.202$ | $n_4 = 1.511$ | $v_4 = 60.5$ |
| $r_7 =$ | 71.905 | | |
| | $d_7 = 8.538$ | | |
| $r_8 =$ | $-62.782$ | | |
| | $d_8 = 3.202$ | $n_5 = 1.511$ | $v_5 = 60.5$ |
| $r_9 =$ | $-54.248$ | | |
| | $d_9 = 6.337$ | | |
| $r_{10} =$ | $-19.576$ | | |
| | $d_{10} = 2.535$ | $n_6 = 1.74$ | $v_6 = 31.7$ |
| $r_{11} =$ | $-39.883$ | | |
| | $d_{11} = 7.671$ | $n_7 = 1.623$ | $v_7 = 57.1$ |
| $r_{12} =$ | $-23.1$ | | |
| | $d_{12} = 0.667$ | | |
| $r_{13} =$ | $-163.534$ | | |
| | $d_{13} = 5.069$ | $n_8 = 1.694$ | $v_8 = 53.3$ |
| $r_{14} =$ | $-60.1$ | | |
| | $f_3 = 250.9$, $f_4 = 692.8$ | | |

In the above, reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_8$ respectively represent refractive indices of respective lenses, and reference symbols $v_1$ through $v_8$ respectively represent Abbe's numbers of respective lenses.

Figure 1:
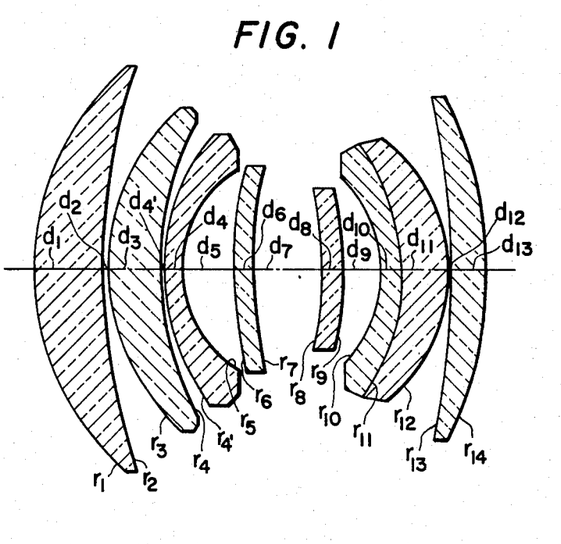
FIG. 1 and FIG. 2 respectively show sectional views illustrating respective embodiments of the lens system according to the present invention.
Figure 2:
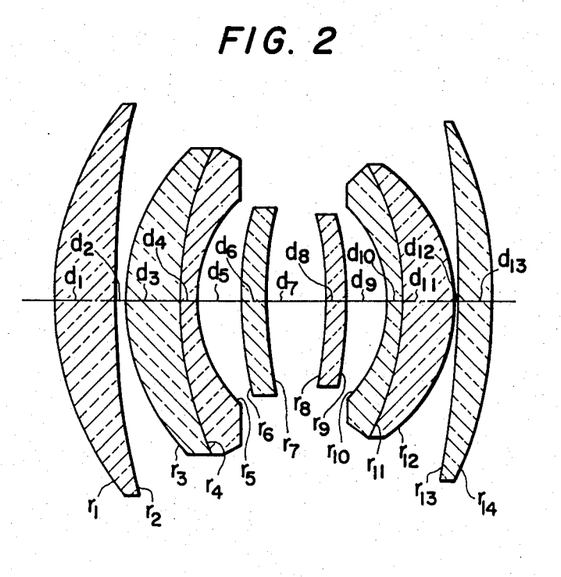
Figures 3A, 3B:
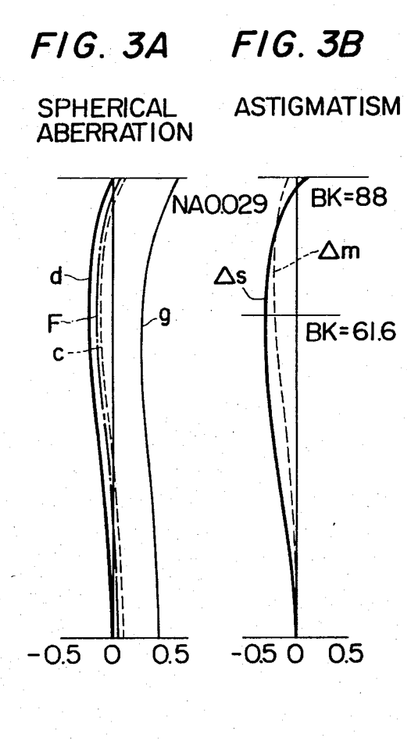
FIGS. 3A, 3B, 3C and 3D respectively show graphs illustrating aberration curves of Embodiment 1 of the present invention.
Figure 3C:
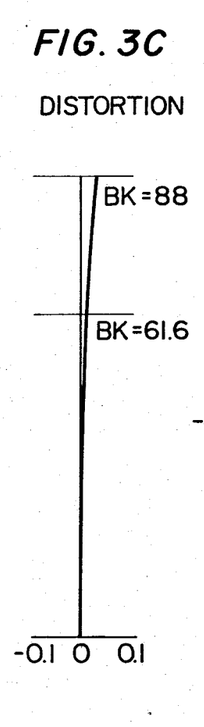
Figure 3D:
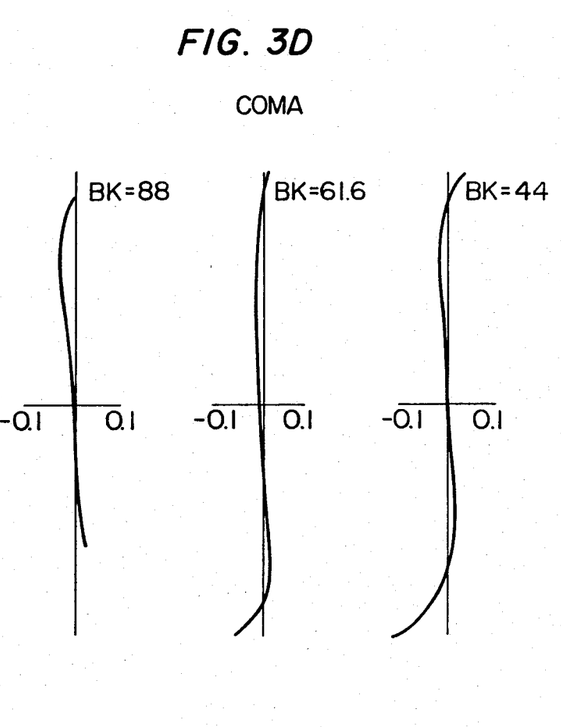
Figures 4A, 4B:
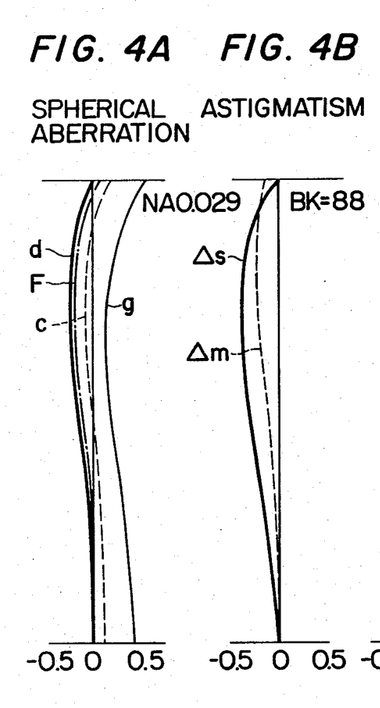
FIGS. 4A, 4B, 4C and 4D respectively show graphs illustrating aberration curves of Embodiment 2.
Figure 4C:
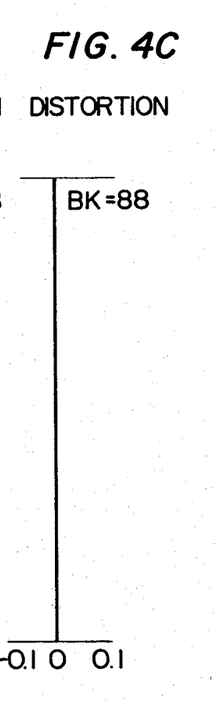
Figure 4D:
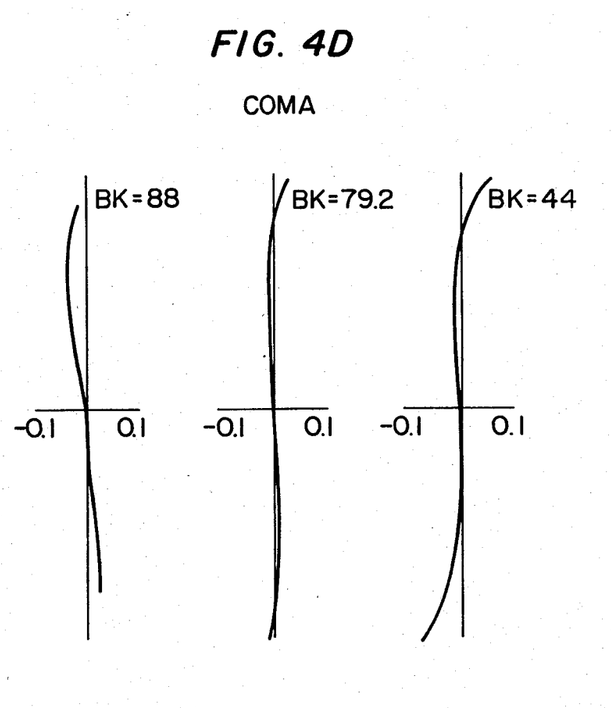
Figures 5A, 5B, 5C:
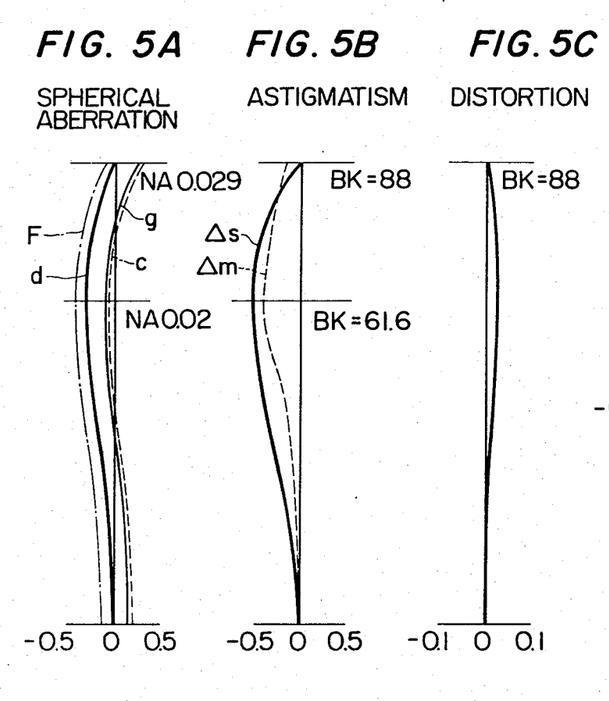
FIGS. 5A, 5B, 5C and 5D respectively show graphs illustrating aberration curves of Embodiment 3.
Figure 5D:
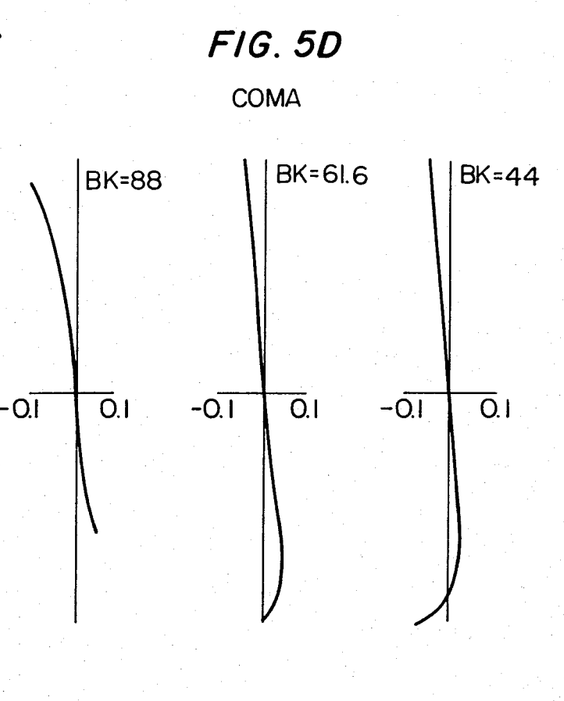
Figures 6A, 6B:
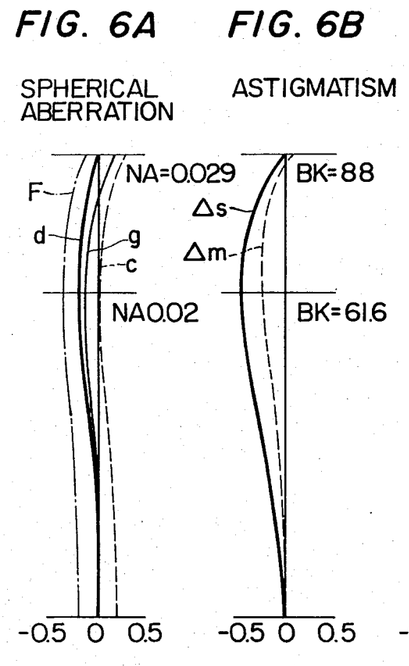
FIGS. 6A, 6B, 6C and 6D respectively show graphs illustrating aberration curves of Embodiment 4.
Figure 6C:
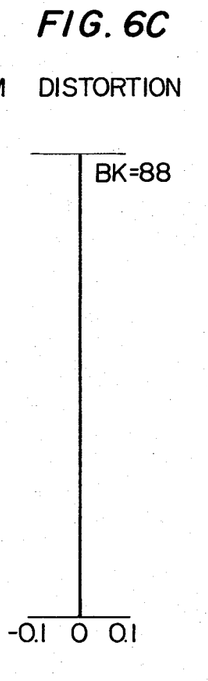
Figure 6D:
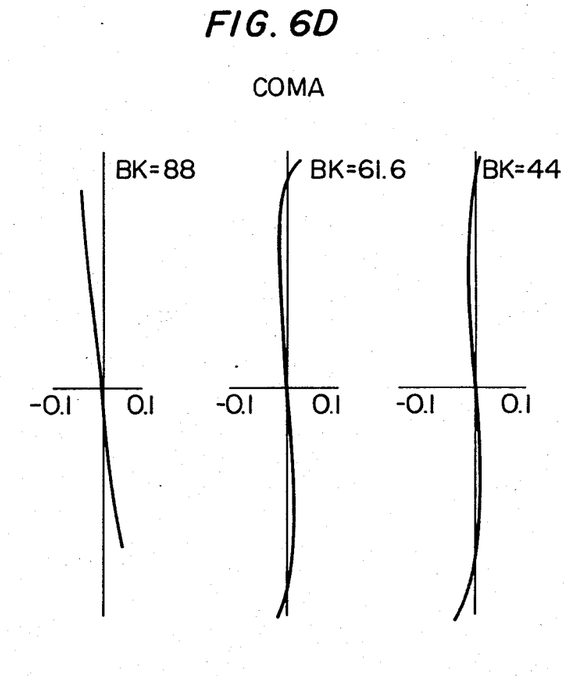
Figure 7A:
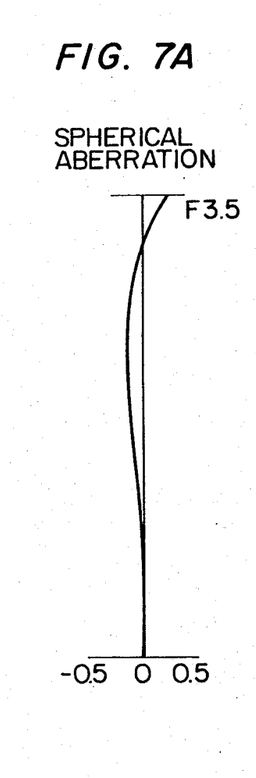
FIGS. 7A and 7B respectively show graphs illustrating aberration curves before correction when the lens system according to Embodiment 1 is used by the magnification X8.
Figure 7B:
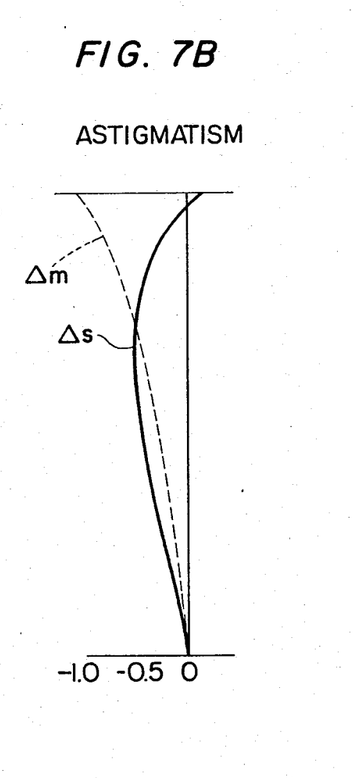
Figure 8A:
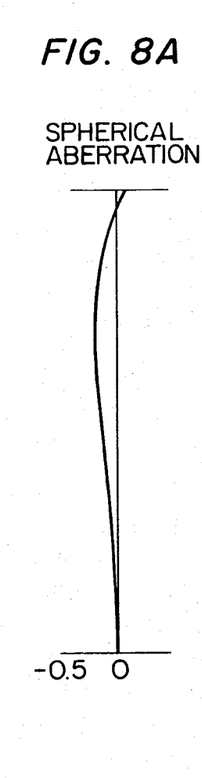
FIGS. 8A and 8B respectively show graphs illustrating aberrations curves after correction when the lens system according to Embodiment 1 is used by the magnification X8.
Figure 8B:
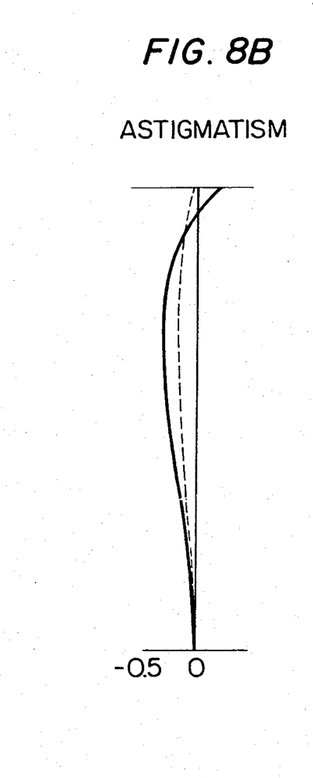

Design magnification of all the above embodiments is X4. Out of them, Embodiments 1 and 3 respectively have lens configuration as shown in FIG. 1. That is, for each of them, the second lens component consists of two lenses separated from each other. The radius of curvature of the concave surface on the stop side of the positive meniscus lens arranged on the object side in the second lens component is $r_4$, the radius of curvature of the convex surface on the object side of the negative meniscus lens is $r_4'$, and the airspace between said positive and negative meniscus lenses, which are separated from each other, is $d_4'$. Aberrations of said Embodiments 1 and 3 are respectively as shown in FIGS. 3A, 3B, 3C and 3D and FIGS. 5A, 5B, 5C and 5D. Embodiments 2 and 4 respectively have lens configuration as shown in FIG. 2. As it is evident from FIG. 2, all the second and fifth lens components of these embodiments are cemented doublet lenses. Aberrations of said Embodiments 2 and 4 are respectively as shown in FIGS. 4A, 4B, 4C and 4D and FIGS. 6A, 6B, 6C and 6D. Besides, for lens systems according to the above-mentioned respective embodiments, it is possible to correct aberrations, which will be aggravated when magnification is varied, by moving a predetermined lens or lenses along the optical axis as described already. To show a concrete example referring to Embodiment 1, 1 aberrations may be corrected by moving the first lens component along the optical axis so that the airspace $d_2$ becomes 1.2 (in case of magnification X2), 0.94 (X4) and 0.15 (X8). Aberrations of Embodiment 1 at that time (magnification X8) are as shown in FIGS. 7A and 7B and FIGS. 8A and 8B. That is, FIGS. 7A and 7B respectively show spherical aberration and astigmatism of Embodiment 1 before correction, while FIGS. 8A and 8B respectively show spherical aberration and astigmatism when they are corrected by moving the first lens component. For the other embodiments, it is also possible to correct aberrations, which aggravate in relation to change of magnification, by moving the first lens component like the above. Moreover, for respective embodidments, it is also possible to correct aberrations, which may otherwise be aggravated, by moving a predetermined lens or lenses other than the first lens component.

I claim:

1. An enlarging lens system comprising a first, second, third, fourth, fifth and sixth lens components, said first lens component being a positive meniscus lens, said second lens component consisting of a positive meniscus lens and negative meniscus lens, said third lens component being a thin lens having weak refractive power, said fourth lens component being a thin lens having weak refractive power, said fifth lens component being a cemented doublet lens consisting of a negative meniscus lens and positive meniscus lens, said sixth lens component being a positive meniscus lens, said enlarging lens system having numerical values as given below:

$F/3.5$, $2\omega = 51°$, $f = 100$

| | | | |
|---|---|---|---|
| $r_1 =$ | 43.002 | | |
| | $d_1 = 9.7$ | $n_1 = 1.658$ | $v_1 = 57.3$ |
| $r_2 =$ | 82.828 | | |
| | $d_2 = 0.94$ | | |
| $r_3 =$ | 29.853 | | |
| | $d_3 = 7.89$ | $n_2 = 1.651$ | $v_2 = 56.2$ |
| $r_4 =$ | 45.678 | | |

-continued

| | | | |
|---|---|---|---|
| $d_{4'} = 0.33$ | | | |
| $r_{4'} = 31.564$ | | | |
| $d_4 = 2.67$ | $n_3 = 1.74$ | $\nu_3 = 31.7$ | |
| $r_5 = 17.391$ | | | |
| $d_5 = 7.36$ | | | |
| $r_6 = 65.049$ | | | |
| $d_6 = 3.21$ | $n_4 = 1.511$ | $\nu_4 = 60.5$ | |
| $r_7 = 89.759$ | | | |
| $d_7 = 8.83$ | | | |
| $r_8 = -80.717$ | | | |
| $d_8 = 3.21$ | $n_5 = 1.511$ | $\nu_5 = 60.5$ | |
| $r_9 = -65.111$ | | | |
| $d_9 = 5.82$ | | | |
| $r_{10} = -19.141$ | | | |
| $d_{10} = 2.67$ | $n_6 = 1.755$ | $\nu_6 = 27.5$ | |
| $r_{11} = -34.134$ | | | |
| $d_{11} = 7.09$ | $n_7 = 1.678$ | $\nu_7 = 55.3$ | |
| $r_{12} = -22.956$ | | | |
| $d_{12} = 0.28$ | | | |
| $r_{13} = -109.774$ | | | |
| $d_{13} = 5.35$ | $n_8 = 1.678$ | $\nu_8 = 55.3$ | |
| $r_{14} = -50.866$ | | | |
| $f_3 = 442.5,$ | $f_4 = 616$ | | | wherein reference symbol $f$ represents the focal length of the lens system as a whole, reference symbols $f_3$ and $f_4$ respectively represent focal lengths of the third and fourth lens components, reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_8$ respectively represent refractive indices of respective lenses and reference symbols $\nu_1$ through $\nu_8$ respectively represent Abbe's number of respective lenses.

2. An enlarging lens system comprising a first, second, third, fourth, fifth and sixth lens components, said first lens component being a positive meniscus lens, said second lens component being a cemented doublet lens consisting of a positive meniscus lens and negative meniscus lens, said third lens component being a thin lens having weak refractive power, said fourth lens component being a thin lens having a weak refractive power, said fifth lens component being a cemented doublet lens consisting of a negative meniscus lens and positive meniscus lens, said sixth lens component being a positive meniscus lens, said enlarging lens system having numerical values as given below:

| | F/3.5, $2\omega = 51°$, $f = 100$ | | |
|---|---|---|---|
| $r_1 =$ | 42.293 | | |
| | $d_1 = 9.072$ | $n_1 = 1.658$ | $\nu_1 = 57.3$ |
| $r_2 =$ | 114.327 | | |
| | $d_2 = 0.941$ | | |
| $r_3 =$ | 29.087 | | |
| | $d_3 = 8.333$ | $n_2 = 1.678$ | $\nu_2 = 53.4$ |
| $r_4 =$ | 54.360 | | |
| | $d_4 = 2.554$ | $n_4 = 1.75$ | $\nu_3 = 35.2$ |
| $r_5 =$ | 18.767 | | |
| | $d_5 = 6.384$ | | |
| $r_6 =$ | 47.849 | | |
| | $d_6 = 3.226$ | $n_4 = 1.511$ | $\nu_4 = 60.5$ |
| $r_7 =$ | 75.093 | | |
| | $d_7 = 8.534$ | | |
| $r_8 =$ | $-69.216$ | | |
| | $d_8 = 3.226$ | $n_5 = 1.511$ | $\nu_5 = 60.5$ |
| $r_9 =$ | $-54.054$ | | |
| | $d_9 = 5.779$ | | |
| $r_{10} =$ | $-19.838$ | | |
| | $d_{10} = 2.554$ | $n_6 = 1.74$ | $\nu_5 = 31.7$ |
| $r_{11} =$ | $-41.143$ | | |
| | $d_{11} = 7.728$ | $n_7 = 1.623$ | $\nu_7 = 57.1$ |
| $r_{12} =$ | $-23.143$ | | |
| | $d_{12} = 0.269$ | | |
| $r_{13} =$ | $-139.129$ | | |
| | $d_{13} = 5.107$ | $n_8 = 1.694$ | $\nu_8 = 53.3$ |
| $r_{14} =$ | $-59.049$ | | |
| | $f_3 = 248.1,$ $f_4 = 450.3$ | | | wherein reference symbol $f$ represents the focal length of the lens system as a whole, reference symbols $f_3$ and $f_4$ respectively represent focal lengths of the third and fourth lens components, reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_8$ respectively represent refractive indices of respective lenses and reference symbols $\nu_1$ through $\nu_8$ respectively represent Abbe's numbers of respective lenses.

3. An enlarging lens system comprising a first, second, third, fourth, fifth and sixth lens component, said first lens component being a positive meniscus lens, said second lens component consisting of a positive meniscus lens and negative meniscus lens, said third lens component being a thin lens having weak refractive power, said fourth lens component being a thin lens having weak refractive power, said fifth lens component being a cemented doublet lens consisting of a negative meniscus lens and positive meniscus lens, said sixth lens component being a positive meniscus lens, said enlarging lens system having numerical values as given below:

| | F/2, $2\omega = 51°$, $f = 100$ | | |
|---|---|---|---|
| $r_1 =$ | 42.24 | | |
| | $d_1 = 9.628$ | $n_1 = 1.658$ | $\nu_1 = 57.3$ |
| $r_2 =$ | 86.542 | | |
| | $d_2 = 1.328$ | | |
| $r_3 =$ | 29.19 | | |
| | $d_3 = 7.835$ | $n_2 = 1.651$ | $\nu_2 = 56.2$ |
| $r_4 =$ | 45.43 | | |
| | $d_{4'} = 0.332$ | | |
| $r_{4'} =$ | 30.932 | | |
| | $d_4 = 2.656$ | $n_3 = 1.807$ | $\nu_3 = 35.4$ |
| $r_5 =$ | 17.784 | | |
| | $d_5 = 7.304$ | | |
| $r_6 =$ | 63.751 | | |
| | $d_6 = 3.187$ | $n_4 = 1.498$ | $\nu_4 = 66.8$ |
| $r_7 =$ | 87.125 | | |
| | $d_7 = 8.765$ | | |
| $r_8 =$ | $-75.216$ | | |
| | $d_8 = 3.187$ | $n_5 = 1.498$ | $\nu_5 = 66.8$ |
| $r_9 =$ | $-68.547$ | | |
| | $d_9 = 6.64$ | | |
| $r_{10} =$ | $-18.527$ | | |
| | $d_{10} = 2.656$ | $n_6 = 1.755$ | $\nu_6 = 27.5$ |
| $r_{11} =$ | $-33.967$ | | |
| | $d_{11} = 7.038$ | $n_7 = 1.67$ | $\nu_7 = 57.3$ |
| $r_{12} =$ | $-23.101$ | | |
| | $d_{12} = 1.328$ | | |
| $r_{13} =$ | $-103.892$ | | |
| | $d_{13} = 5.312$ | $n_8 = 1.678$ | $\nu_8 = 55.3$ |
| $r_{14} =$ | $-43.949$ | | |
| | $f_3 = 456.5,$ $f_4 = 1339.6$ | | | wherein reference symbol $f$ represents the focal length of the lens system as a whole, reference symbols $f_3$ and $f_4$ respectively represent focal lengths of the third and fourth lens components, reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_8$ respectively represent refractive indices of respective lenses and reference symbols $\nu_1$ through $\nu_8$ respectively represent Abbe's numbers of respective lenses.

4. An enlarging lens system comprising a first, second, third, fourth, fifth and sixth lens components, said first lens component being a positive meniscus lens, said second lens component being a cemented doublet lens consisting of a positive meniscus lens and negative meniscus lens, said third lens component being a thin lens having weak refractive power, said fourth lens component being a thin lens having a weak refractive power, said fifth lens component being a cemented doublet lens consisting of a negative meniscus lens and positive meniscus lens, said sixth lens component being a positive meniscus lens, said enlarging lens system having numerical values as given below:

| F/2, $2\omega = 51°$, f = 100 | | | |
|---|---|---|---|
| $r_1 =$ | 43.292 | | |
| | $d_1 = 9.005$ | $n_1 = 1.658$ | $\nu_1 = 57.3$ |
| $r_2 =$ | 133.279 | | |
| | $d_2 = 1.334$ | | |
| $r_3 =$ | 28.255 | | |
| | $d_3 = 8.271$ | $n_2 = 1.678$ | $\nu_2 = 53.4$ |
| $r_4 =$ | 52.603 | | |
| | $d_4 = 2.535$ | $n_3 = 1.783$ | $\nu_3 = 36.2$ |
| $r_5 =$ | 18.831 | | |
| | $d_5 = 6.337$ | | |
| $r_6 =$ | 46.768 | | |
| | $d_6 = 3.202$ | $n_4 = 1.511$ | $\nu_4 = 60.5$ |
| $r_7 =$ | 71.905 | | |
| | $d_7 = 8.538$ | | |
| $r_8 =$ | −62.782 | | |
| | $d_8 = 3.202$ | $n_5 = 1.511$ | $\nu_5 = 60.5$ |
| $r_9 =$ | −54.248 | | |
| | $d_9 = 6.337$ | | |
| $r_{10} =$ | −19.576 | | |
| | $d_{10} = 2.535$ | $n_6 = 1.74$ | $\nu_6 = 31.7$ |
| $r_{11} =$ | −39.883 | | |
| | $d_{11} = 7.671$ | $n_7 = 1.623$ | $\nu_7 = 57.1$ |
| $r_{12} =$ | −23.1 | | |
| | $d_{12} = 0.667$ | | |
| $r_{13} =$ | −163.534 | | |
| | $d_{12} = 5.069$ | $n_8 = 1.694$ | $\nu_8 = 53.3$ |
| $r_{14} =$ | −60.1 | | |
| $f_3 = 250.9$, $f_4 = 692.8$ | | | | wherein reference symbol $f$ represents the focal length of the lens system as a whole, reference symbols $f_3$ and $f_4$ respectively represent focal lengths of the third and fourth lens components, reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_8$ respectively represent refractive indices of respective lenses and reference symbols $\nu_1$ through $\nu_8$ respectively represent Abbe's numbers of respective lenses.

* * * * *